United States Patent [19]

Matsubara et al.

[11] Patent Number: 5,248,337
[45] Date of Patent: Sep. 28, 1993

[54] STABLE LEAD CHROMATE PIGMENT COMPOSITION AND PROCESS FOR PRODUCING THE SAME

[75] Inventors: Hiroyuki Matsubara; Takashi Shigematsu; Kazuo Konno; Minoru Yokoyama, all of Tokyo, Japan

[73] Assignee: Toho Ganryo Kogyo Co., Ltd., Tokyo, Japan

[21] Appl. No.: 683,156

[22] Filed: Apr. 10, 1991

[30] Foreign Application Priority Data

Apr. 11, 1990 [JP] Japan .................................. 2-93979
Oct. 29, 1990 [JP] Japan .................................. 2-288483

[51] Int. Cl.$^5$ .......................... C09C 1/14; C09C 1/34
[52] U.S. Cl. .................................. 106/434; 106/433; 106/454; 106/455
[58] Field of Search ................. 106/455, 454, 433, 434

[56] References Cited

U.S. PATENT DOCUMENTS 3,690,906  9/1972  Buckley et al. ...................... 106/454
3,871,894  3/1975  Kubo et al. ........................... 106/454
4,063,956  12/1977 Higgins ................................. 106/455

Primary Examiner—Mark L. Bell
Assistant Examiner—Scott L. Hertzog
Attorney, Agent, or Firm—Sughrue, Mion, Zinn, Macpeak & Seas

[57] ABSTRACT

A stable lead chromate pigment composition comprising a lead chromate pigment which has been treated by forming a continuous amorphous silica encapsulation on the surface of each particle of the pigment and subsequently depositing an antimony compound on the silica encapsulation and the process for producing the same.

4 Claims, 5 Drawing Sheets

DOSE RESPONSE CURVE FOR TA100

DOSE RESPONSE CURVE FOR TA1535

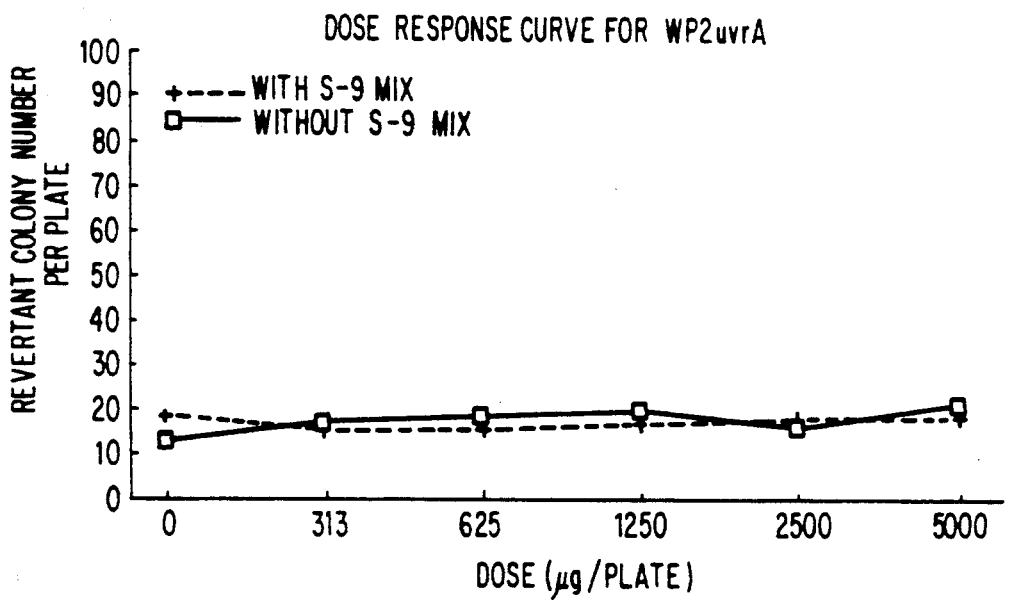
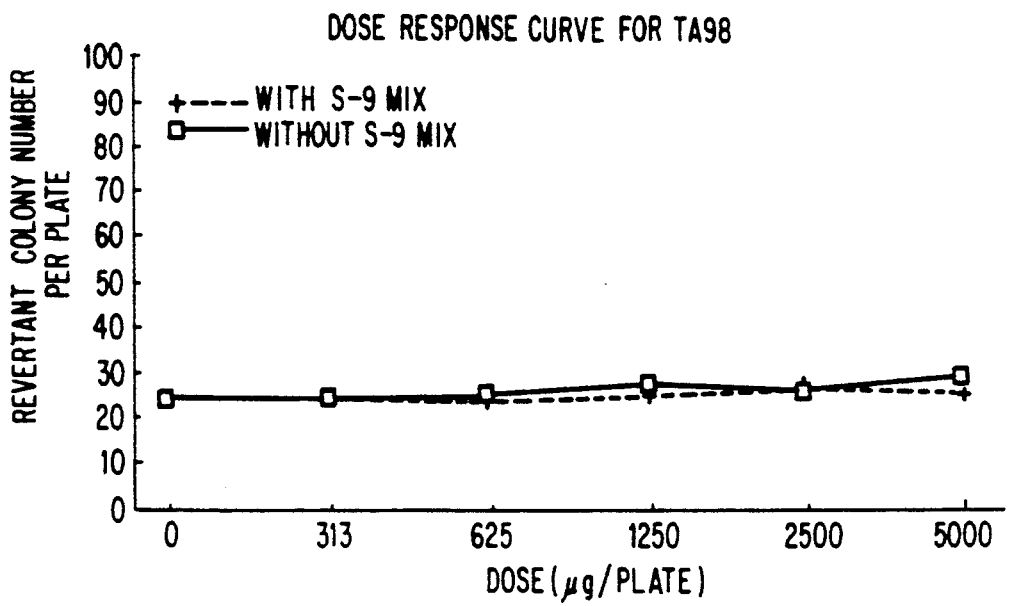

DOSE RESPONSE CURVE FOR TA1537

DOSE RESPONSE CURVE FOR TA1538

DOSE RESPONSE CURVE FOR TA100

DOSE RESPONSE CURVE FOR WPuvrA

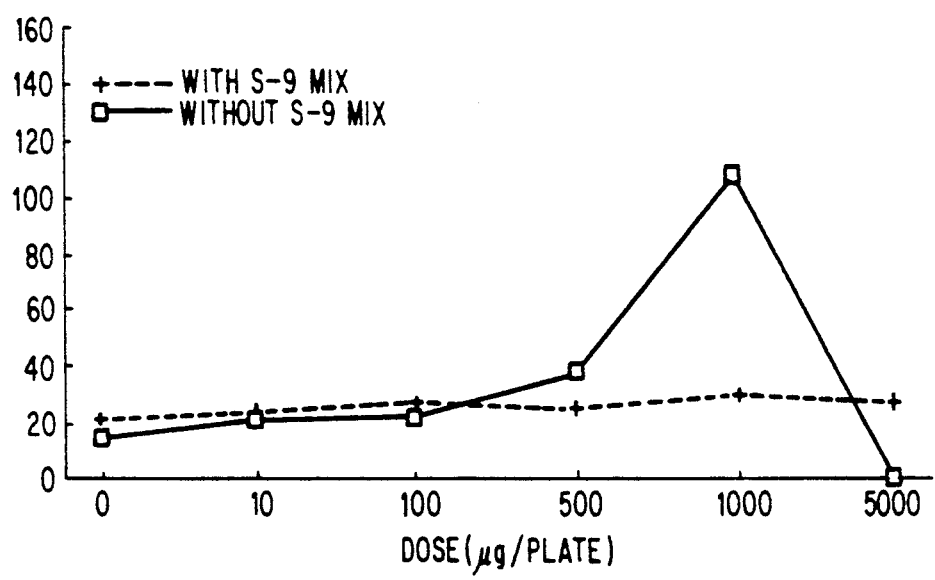

STABLE LEAD CHROMATE PIGMENT COMPOSITION AND PROCESS FOR PRODUCING THE SAME

FIELD OF THE INVENTION

The present invention relates to a stable lead chromate pigment composition and a process for producing the composition.

More particularly, the invention relates to a stable lead chromate pigment composition which comprises a lead chromate pigment consisting mainly of a lead chromate and which has yellow, orange, or red hue and has a good color fastness to chemicals, light, weathering, heat, etc., which, when brought into contact with a strong aqueous acid solution, does not release hexavalent chromium into the acid solution in a detectable amount and releases lead in only a slight amount, and which is negative in inducing reverse mutation of microorganisms. The present invention also relates to an industrial process for producing such a stable lead chromate pigment composition.

BACKGROUND OF THE INVENTION

Lead chromate pigments, which contain lead chromate as major component, include chrome yellow pigments which provide hues ranging from a greenish yellow to orange and molybdate red or orange pigments containing lead chromate-molybdate which provides hues ranging from orange to red, as specified in the Japanese Industrial Standard (JIS K5110), International Organization for Standardization (ISO 3711), American Society for Testing and Materials (ASTM 211), and Deutsche Industrie Normen (DIN 55975). Lead chromate pigments are represented by Colour Index (CI) Nos. 77600, 77601, 77603, and 77605.

Lead chromate pigments are excellent pigments characterized by their brilliance of tone and high hiding power, and are used in paints and as colorants for synthetic resins. These pigments are highly suitable for use in public applications because they are indispensable, in particular, as a traffic paint material.

However, lead chromate pigments have a drawback in that their brilliant tones are apt to fade because they readily undergo chemical changes upon contact with acids, alkalis, or sulfides, such as hydrogen sulfide, in the air.

Further, lead chromate pigments suffer fading when an external stimulus such as heat or ultraviolet rays is applied thereto, as such a stimulus causes the pigment compositions to release part of the oxygen contained therein and to reduce hexavalent chromium. For this reason, if such lead chromate pigments are used with synthetic resins such as polyethylene, polypropylene, ABS and polyamide resins, color fading of the pigments is unavoidable because these resins are molded at temperatures not lower than 200° C.

Conventionally, a number of measures have been proposed and practiced for suppressing the color fading of lead chromate pigments to thereby improve their performance.

For example, U.S. Pat. Nos. 2,212,917, 2,296,638, 2,316,244 and 2,365,171 disclose the use of water-soluble aluminum salts, titanium salts, zirconium salts, silicates, antimony salts, cerium salts, etc., as treating materials for lead chromate pigments.

Improvements in the above approaches have recently been proposed which involve coating the lead chromate pigments with silica. Such a coating approach is the most commonly used technique at present. See JP-B-46-9555, JP-B-46-34788, JP-B-46-42713, JP-B-48-32415, JP-B-49-20925 and JP-B-50-14254. The term "JP-B" as used herein means an "examined Japanese patent publication".

In addition to the silica-treatment technique, it has also been proposed to suppress the color fading of lead chromate pigments by the mixed use of silica and antimony. See U.S. Pat. No. 3,690,906.

It is also known that lead chromate pigments can be treated with a metal oxide derived from a water-soluble metal compound by heating the lead chromate pigments in hot water under pressure while stirring, thereby attaining improved heat resistance, light resistance, etc. See JP-B-49-16531.

Of the large number of proposals for improvements in the color fastness properties of lead chromate pigments, the silica-coated lead chromate pigments, which are obtained by densely coating the pigment particles with amorphous silica, are currently regarded as most reliable.

However, since the conditions under which lead chromate pigments are used have become more and more severe in recent years, even the conventional lead chromate pigments coated with silica, silica-alumina or zirconium-silica are still unsatisfactory with respect to meeting quality requirements regarding improvements in color fastness properties and with respect to the suppression of the dissolution of heavy metal components.

One reason for the above may be that slight amounts of chromium and lead which dissolve out during the silica-coating reaction are reprecipitated or adsorbed, causing the resulting silica coating to be incomplete.

Further, the lead chromate pigments of U.S. Pat. No. 3,690,906 which have been treated with silica-antimony are significantly inferior to the silica-coated lead chromate pigments in color fastness properties and in the suppression of the dissolution of heavy metal components. This inferiority is due to a deficient amount of silica used as well as the presence of a large number of translucent gel-like particles that are in a free state without forming a coating, the presence of these particles being attributable to the use of improper conditions for silica formation. Their presence can be ascertained by examination with a transmission electron microscope (at a magnification of 10,000 to 100,000 times).

As stated above, conventionally only improvements in the heat, light or chemical resistance of lead chromate pigments during use have been attempted. Although lead chromate pigments have very low solubility, the dissolution of heavy metals, such as hexavalent chromium and lead, which dissolve in only slight amounts, has not been able to be sufficiently suppressed, so that improvements in the safety upon use of lead chromate pigments has not yet been successful.

With respect to negation of the toxicity of hexavalent chromium in a biological test by the addition of S-9 mix etc., Fernando L. Petrilli and Silvio De Flora have reported in Mutation Research, 54 (1978), pp. 139-147.

This toxicity negation was ascertained by the present inventors through many microbiological tests in which S-9 mix was added as a metabolic activator, as in the above report, to lead chromate pigment samples and most of the resulting pigments were considered as negative in inducing reverse mutation.

However, although lead chromate pigments are caused to be negative in reverse mutation induction by the toxicity-negating action of a material such as asorbic acid or the mixed agent consisting of G6 PD and S-9 mix as shown in the report by De Flora et al., this cannot be regarded as a substantive property improvement.

Therefore, in industrial fields where lead chromate pigments are manufactured and used, there is a strong need for a lead chromate pigment which in itself is negative in inducing reverse mutation and is, hence, safe from an environmental hygiene standpoint and which can be produced by a rational industrial process.

SUMMARY OF THE INVENTION

Considering the above, the present inventors conducted intensive research in order to find a way to improve the stability and safety of lead chromate pigments. As a result, they found that a pigment obtained by treating a silica-encapsulated lead chromate pigment with an antimony compound has extremely high stability. The present invention was completed based on such finding.

Accordingly, an object of the present invention is to provide a stable lead chromate pigment composition that has good color fastness properties and is less apt to release heavy metal components.

Another object of the present invention is to provide an advantageous industrial process for producing the above stable lead chromate pigment composition.

Other objects and effects of the present invention will be apparent from the following description.

BRIEF DESCRIPTION OF THE DRAWINGS

FIG. 3 is a dose response curve showing the results of a reverse mutation assay for the pigment sample of Example 7 using WP2uvrA strain. There is no substantial change in the curve.

FIG. 4 is a dose response curve showing the results of a reverse mutation assay for the pigment sample of Example 7 using TA98 strain. There is no substantial change in the curve.

FIG. 9 is a dose response curve showing the results of a reverse mutation assay for the pigment sample of Comparative Example 3 using TA98 strain. Although there was no substantial change when S-9 mix was added, a considerable increase in revertant colony number was observed when S-9 mix was not added.

DETAILED DESCRIPTION OF THE INVENTION

Figure 1:
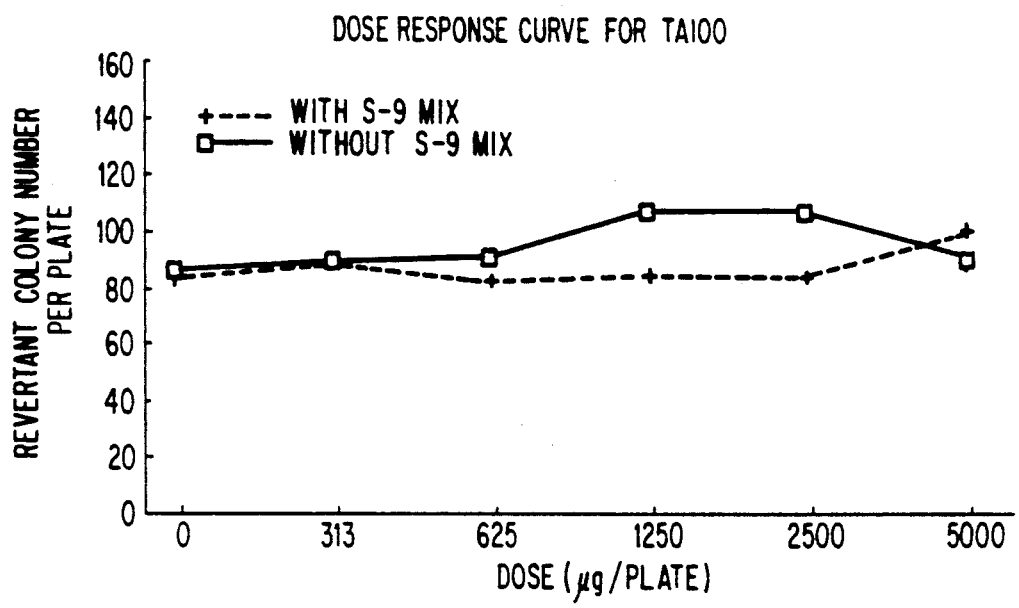
FIG. 1 is a dose response curve showing the results of a reverse mutation assay for the pigment sample of Example 7 using TA100 strain. There is no substantial change in the curve.
Figure 2:
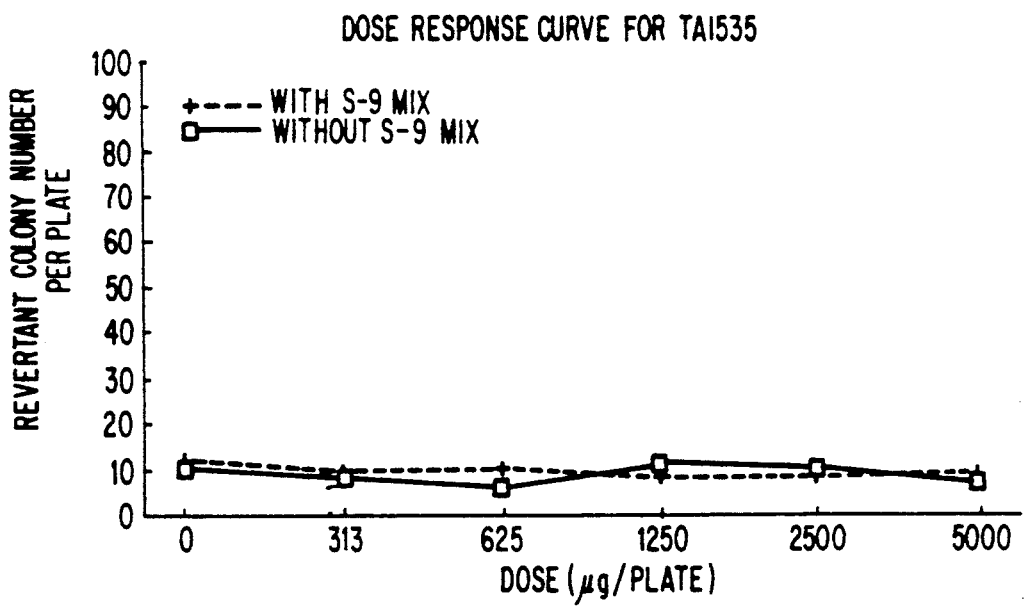
FIG. 2 is a dose response curve showing the results of a reverse mutation assay for the pigment sample of Example 7 using TA1535 strain. There is no substantial change in the curve.
Figure 5:
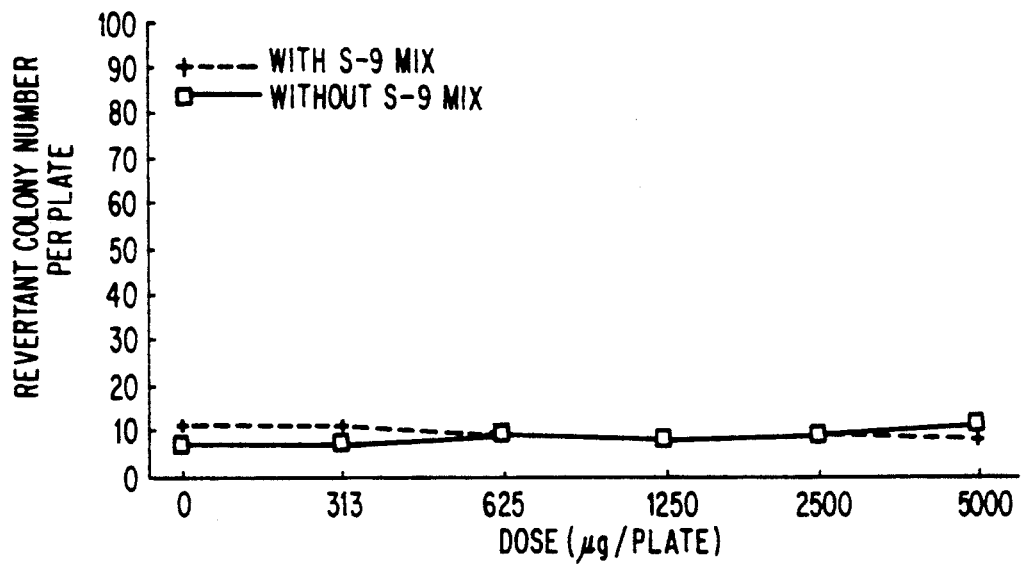
FIG. 5 is a dose response curve showing the results of a reverse mutation assay for the pigment sample of Example 7 using TA1537 strain. There is no substantial change in the curve.
Figure 6:
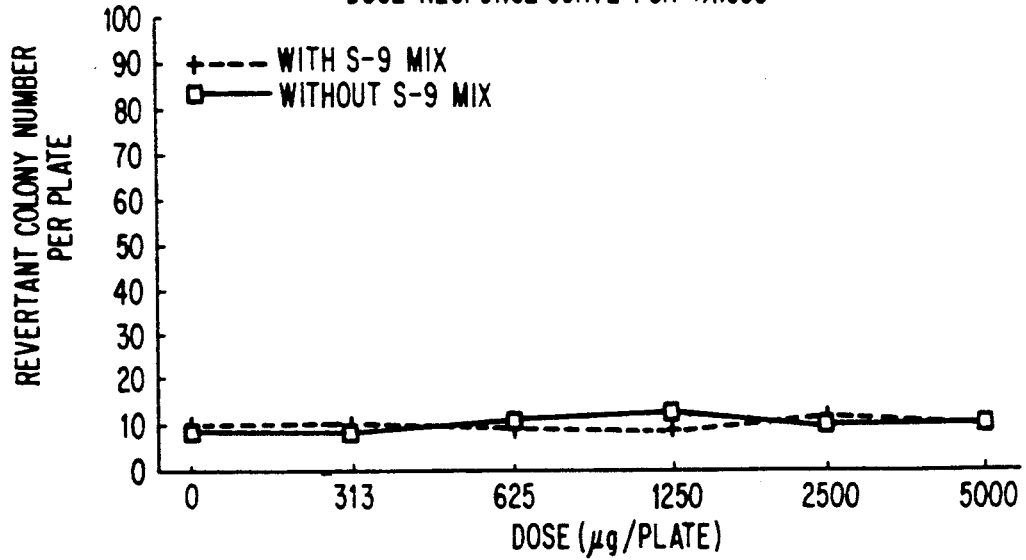
FIG. 6 is a dose response curve showing the results of a reverse mutation assay for the pigment sample of Example 7 using TA1538 strain. There is no substantial change in the curve.

In one aspect of the present invention, there is provided a stable lead chromate pigment composition comprising a lead chromate pigment which has been treated by forming a continuous amorphous silica encapsulation on the surface of each particle of the pigment, whereafter an antimony compound is deposited on the silica encapsulation as another step.

The lead chromate pigment of the present invention is a pigment containing a lead chromate as a major component (at least 50% by weight), as illustrated in Colour Index and *Pigment Handbook*, vol. 1, pp 357–383, ed. by T. C. Patton, pub. by A Wiley-Interscience Publication (1973). Typical examples thereof include CI-No. 77600 (lead chromate pigment), CI-No. 77601 (basic lead chromate pigment), CI-No. 77603 (lead sulfochromate pigment), CI-No. 77605 (orange to red lead chromate-molybdate pigment), etc.

An important feature of the lead chromate pigment composition of the present invention is that any of the above-mentioned pigments can be densely encapsulated with a continuous silica encapsulation by a technique such as described, for example, in JP-B-46-9555, JP-B-46-34788, and JP-B-50-14254, and the silica encapsulation in turn is covered with a protective coating formed by deposition of an antimony compound derived from an aqueous antimony salt solution, which composition has the particle size range of about from 0.1 to 1 μm.

The antimony compound derived from an aqueous antimony salt solution is a product of the hydrolysis of a soluble antimony salt such as, for example, an antimony halide as will later be described. Since such hydrolysis reaction is complex, it is difficult to chemically identify the hydrolyzate of the final product, which is formed by the further reaction of the intermediates, such as $SbOCl$, $Sb_4O_3(OH)_3Cl_3$ and $Sb_4O_3(OH)_5Cl$, with alkali, acid, etc. That is, this hydrolyzate consists mainly of minute hydrated antimony oxide particles and complex compounds formed by reactions with ingredients present in the reaction system.

In the present invention, the silica encapsulation and antimony coating constitute a rigid combination of two layers, which layers are strongly adhered each other to such a degree that they seem united, to provide the stable lead chromate pigment composition. The thickness of silica encapsulation layer is about from 100 to 600 Å whereas that of antimony coating seems to be 5 to 50 Å.

By covering the silica encapsulation with the protective structure formed through deposition of an antimony compound derived from an antimony salt, color fastness properties under severe conditions of use, which properties cannot be attained with conventional silica-coated lead chromate pigments, are enhanced and the dissolution of hexavalent chromium and lead into an aqueous solution of a strong acid is suppressed. As a result, the pigment compositions of the present invention show excellent stability in a reverse mutation assay which uses microorganisms and is one testing method for evaluating the toxicity of harmful substances.

The amount of the silica encapsulated on the lead chromate pigment varies depending on the use of the pigment. In particular, for the purpose of sufficiently protecting the pigment itself which contains hexavalent chromium and lead, the silica encapsulating amount should be from 10% to 40% by weight in terms of the amount of $SiO_2$ based on the total weight of the coated pigment (pigment plus silica encapsulation). In most cases, the amount of silica is preferably in the range of from 15 to 25% by weight, same basis.

The amount of the antimony compound deposited on the silica encapsulation is generally in the range of from 0.5 to 5% by weight, preferably from 0.8 to 3% by weight, in terms of the amount of $Sb_2O_3$ based on the total weight of the encapsulated pigment (pigment plus silica encapsulation and antimony compound).

Although the amount of antimony is relatively small, the antimony exhibits a synergistic effect with the silica encapsulation, thereby providing an improvement in pigment quality which the conventional lead chromate pigments do not exhibit.

The lead chromate pigment composition according to the present invention is characterized in that when the composition is brought into contact with a strong acid, it releases hexavalent chromium into the acid at a concentration of 0.2 ppm or less in terms of the concentration of dissolved Cr, and releases lead into the acid in an amount of 1% by weight or less in terms of the amount of dissolved Pb based on the total amount of the composition.

The concentration of released hexavalent chromium is determined by dispersing 1 g of a pigment sample in 100 ml of 0.3N hydrochloric acid as a strong acid by stirring the mixture of the sample and the acid at 20° C. for 60 minutes, and then measuring the concentration of $Cr^{6+}$ that has dissolved into the acid.

The amount of released lead, on the other hand, is determined by measuring the amount of lead that has dissolved under the same conditions as the above and expressed in terms of percent by weight based on the total weight of the lead chromate pigment composition of the invention.

In the case where the stable lead chromate pigment composition of the present invention is one in which the amount of the deposited antimony compound is at least 1 mg/m², preferably from 2 to 30 mg/m², in terms of the amount of $Sb_2O_3$ per m² of the surface area of the lead chromate pigment, and the concentration of released hexavalent chromium is 20 ppm or less in terms of Cr concentration, the pigment composition is characterized as being negative in a reverse mutation assay.

In this connection, it should be noted that all the conventional lead chromate pigments encapsulated with continuous silica release hexavalent chromium at concentrations of 20 ppm or more, and even upon treating such silica-encapsulated lead chromate pigments with a reducing agent, such as L-ascorbic acid, sodium hydrogen sulfite, etc., at a pH where reduction of hexavalent chromium takes place, the dissolution of hexavalent chromium and lead into strong acid aqueous solutions could not be reduced significantly. In view of the above, it can be understood that the stable lead chromate pigment composition of the present invention shows extremely high stability.

"Surface area" herein means the area as calculated from the specific gravity $\rho$ (g/cm³) and the biaxial average diameters d (μm) of 1,000 particles on an electron photomicrograph at a magnification of 10,000 times. That is, specific surface area S (m²/g) can be obtained by the following formula:

$$S = \frac{6}{\rho \times d}$$

The ground that the lead chromate pigment composition showing a released hexavalent chromium concentration of 20 ppm or less in terms of Cr concentration is judged to be negative in inducing reverse mutation as discussed above can be explained based on the results as shown in the Examples, that is, the following explanation can be made.

It is known that the reverse mutation assay using microorganisms and a histidine-free medium is an effective means for evaluating a harmful substance in vitro. The procedure for this assay has been internationally standardized by the Organization for Economic Cooperation and Development (OECD), and is also specified in the laws and ordinances in Japan.

Although all the samples that were positive in this assay cannot be immediately judged dangerous, those regarded as negative are sufficiently safe.

Six kinds of microorganisms are used in the assay, according to the provisions by the OECD. They are base pair substitution-type *Salmonella typhimurium*, stains TA-100, and TA-1535, and *E. coli*, strain WP2uvrA and frameshift-type *S. typhimurium*, strains TA-98, TA-1537, and TA-1538.

In the case where S-9 mix for activating metabolism was added in the assays conducted by the present inventors, all the samples tested were negative in inducing mutation as described in the report by De Flora et al earlier cited.

In the case where S-9 mix was not added, there were differences among the samples. Hence, the results obtained in the reverse mutation assays were quantitatively expressed to statistically obtain the relation thereof to the solubility in a strong acid.

Further, revertant colonies observed according to sample dose levels were counted, and the ratio of the maximum colony number to the colony number for control (hereinafter referred to as the mutation ratio "R") was calculated. As a result, it was found that of the six kinds of microorganisms used, WP2uvrA and TA-98 were more sensitive to the slightly soluble hexavalent chromium contained in the pigment composition of the present invention, followed by TA-100.

Therefore, since WP2uvrA and TA-98 always approximated each other in control colony number in many assays, a regression equation involving the average of the mutation ratios R for these two kinds of microorganisms and the concentration of hexavalent chromium released into 0.3 N hydrochloric acid was obtained by the least squares method. As a result, it was found that the relationship between the average mutation ratio R and the concentration is accurately expressed by the following equation.

$$R = 1.02 \times 1.0342^A$$

where A is the concentration of hexavalent chromium ($Cr^{6+}$, ppm) released into the 0.3N hydrochloric acid liquid phase.

Since pigments having mutation ratios $R \geq 2$ are generally judged positive in inducing reverse mutation, it can be said that in order to obtain a negative lead chromate pigment based on the above regression equation obtained from the results of assays conducted by the present inventors, the concentration of hexavalent chromium that has dissolved into 0.3N hydrochloric acid extractant should be 20 ppm or less.

In this respect, the lead chromate pigment composition according to the present invention is clearly negative in reverse mutation induction since the concentration of released hexavalent chromium is as low as 1 ppm or less in terms of Cr concentration.

In another aspect of the present invention, a process for producing the above-described lead chromate pigment composition of the invention is provided. This process comprises adding an aqueous solution of an alkali silicate to an aqueous alkaline slurry of a lead chromate pigment while the slurry is heated, reacting the alkali silicate with the pigment to thereby deposit dense amorphous silica on the surfaces of the particles of the pigment, and then adding an aqueous solution of an antimony salt to the resulting silica-encapsulated lead chromate pigment slurry to thereby deposit a highly adherent antimony compound on the silica-encapsulated lead chromate pigment.

That is, in the first step of the process, an aqueous solution of an alkali silicate is added to an aqueous alkaline slurry of a lead chromate pigment while the slurry is heated, and the alkali silicate is reacted with the pigment, to thereby deposit silica on the surfaces of the pigment particles.

It is preferable that before it is subjected to the silica encapsulation treatment the lead chromate pigment slurry be subjected to a dispersing treatment in order to make the pigment particles sufficiently close to primary particles. For this reason, the slurry may preferably be treated with a dispersing machine suitably selected from ones ordinarily used in the pigment industry, such as, for example, a homogenizer, a colloid mill, a sand mill and a Waring blender. The dispersion time is usually from 10 minutes to 1 hour, depending on the dispersing machine employed.

In most cases, this dispersing of the slurry is preferably conducted at a slurry temperature of from 15° to 80° C. and at a slurry pigment concentration of from 50 to 350 g/l, particularly from 80 to 200 g/l.

The aqueous alkaline slurry of a lead chromate pigment is then heated to 80° C. or more, preferably at 90° to 98° C., and the pH of the slurry is adjusted to a value between 9.3 and 10.5 by adding an aqueous solution of sulfuric acid or sodium silicate thereto.

To this pigment slurry, an aqueous solution of an alkali silicate is added over an extended time period while the temperature and pH of the slurry are kept constant at the initial values, to thereby gradually react the alkali silicate with the pigment to form a uniform silica encapsulation on each pigment particle.

Maintaining the pH of the slurry constant throughout the addition and reaction of the aqueous alkali silicate solution can be accomplished, for example, by simultaneously adding the aqueous silicate solution and an solution of an acidifying agent over a period of 1 to 6 hours so as to keep the pH constant from the beginning to the termination of the reaction.

Representative examples of the aqueous alkali metal silicate solution are aqueous solutions of sodium silicate and potassium silicate.

Examples of the acidifying agent include inorganic acids such as sulfuric acid, hydrochloric acid and nitric acid, and organic acids such as formic acid, acetic acid and propionic acid. The acidifying agent is not particularly limited so long as it is soluble in water.

In most cases, however, inorganic acids are generally used from the standpoints of wastewater treatment and economy. In particular, sulfuric acid is industrially and advantageously used in view of environmental problems such as air and water pollution.

Thus, due to the presence of an aqueous alkali metal silicate solution in the slurry which is stirred under the same conditions, a continuous amorphous silica coating is formed on the surface of each particle of the lead chromate pigment.

The amount of the silica encapsulation should be in the range of 10% to 40% by weight in terms of the amount of $SiO_2$ based on the total amount of the lead chromate pigment composition.

If the amount of silica encapsulation is more than about 40% by weight in terms of $SiO_2$ amount, not only is the durability-improving effect per $SiO_2$ amount no further enhanced, but pigment properties such as coloring power and hiding power also are impaired. The effective and preferred range of the silica amount is from 15 to 25% by weight in terms of $SiO_2$ amount.

Subsequently, an aqueous solution of an antimony salt is slowly added to the silica-encapsulated lead chromate pigment slurry obtained above over about 10 to 60 minutes and then the slurry is stirred for about 15 minutes. A neutralization reaction is then conducted by slowly adding a dilute aqueous alkali solution of sodium hydroxide, sodium carbonate, etc., over about 10 to 60 minutes, thereby depositing a highly adherent antimony compound on the silica-encapsulated pigment. This treatment is a major characteristic of the process of the present invention.

The addition of the aqueous antimony salt solution to the silica-encapsulated lead chromate pigment slurry may be accomplished in several ways.

In one method, after the lead chromate pigment slurry has undergone silica-encapsulation, the antimony salt aqueous solution is subsequently added to the resulting slurry, thereby directly conducting the antimony salt treatment.

In another method, the pigment slurry that has undergone silica-encapsulation treatment is washed through decantation and then subjected to the antimony salt treatment.

In still another method, the silica-encapsulated lead chromate pigment is dried at a temperature of about 100° to 130° C, pulverized, and then re-dispersed in water, and the resulting slurry is subjected to the antimony salt treatment.

Whichever method is used, the aqueous antimony salt solution is added to the silica-encapsulated lead chromate pigment slurry in an amount of from 0.5 to 5% by weight, preferably from 0.8 to 3% by weight, in terms of the amount of $Sb_2O_3$ based on the total amount of the lead chromate pigment composition. This addition is conducted in a gradual manner at ordinary room temperature (generally 15° to 25° C.) or with heating.

For the purpose of obtaining a lead chromate pigment composition with good reproducibility which is negative in inducing reverse mutation, the surface area of the raw lead chromate pigment is measured before silica encapsulation and, after the pigment is encapsulated with silica, an antimony salt aqueous solution is gradually added to the silica-encapsulated pigment slurry in an amount of from 1 to 50 mg/m², preferably from 2 to 30 mg/m², in terms of the amount of $Sb_2O_3$ per m² of the surface area of the lead chromate pigment.

Subsequently, an aqueous alkaline solution is added to the resulting slurry to neutralize it, thereby depositing an antimony compound on the silica encapsulated pigment to complete encapsulation.

Examples of the aqueous antimony salt solution include a solution obtained by dissolving an antimony halide containing a trivalent antimony salt as a major component (e.g., antimony trichloride and antimony trifluoride) in a saturated aqueous solution of an alkali metal halide (e.g., sodium chloride, potassium chloride and sodium fluoride), a saturated aqueous solution of an alkaline earth metal halide (e.g. magnesium chloride and calcium chloride), or a saturated aqueous solution of ammonium chloride; a solution obtained by adding water or diluted hydrochloric acid to a trivalent antimony halide such as $SbCl_3$ and $SbBr_3$; and a solution obtained by dissolving antimony trioxide in hydrofluoric acid or in a mixed acid composed of hydrofluoric acid and hydrochloric acid.

In the case of antimony trichloride, it is industrially advantageous to use the same after it has been dissolved in a saturated aqueous solution of an alkali metal halide, a saturated aqueous solution of an alkaline earth metal halide or a saturated aqueous solution of ammonium chloride in order to easily conduct liquid-liquid addition and reaction, because antimony trichloride immediately hydrolyzes upon contact with water to form a hydrate precipitate.

The concentration of the aqueous antimony salt solution preferably is from 1 to 20% by weight in terms of $Sb_2O_3$ concentration.

After the antimony salt treatment, the resulting pigment is washed with water, filtered, dried and then pulverized in a conventional manner to thereby obtain a lead chromate pigment composition in which each pigment particle is encapsulated with a substantially uniform and continuous amorphous silica encapsulation and where an antimony compound has been deposited on the silica encapsulation.

The lead chromate pigment composition according to the present invention shows greatly improved color fastness to severe external conditions, e.g., heat, light, etc., as compared with conventional lead chromate pigments, including those treated with silica-antimony, those treated with silica, and those treated with oxides of metals including antimony, because in the pigment composition of the present invention, the silica encapsulating each pigment particle and the antimony compound structure have been strongly adhered to form a highly durable coating. Such an effect was quite unexpected.

In addition to the above-described greatly improved color fastness properties as a pigment, it is also noteworthy that, due to the above-described highly durable protective coating, the pigment composition of the present invention is superior to conventional treated or encapsulated lead chromate pigments with respect to the suppression of dissolution of hexavalent chromium and lead, which are the main components of the pigment, into a strong aqueous acid solution, and is also completely negative in a reverse mutation assay.

The present invention is now explained in more detail with reference to the following Examples, which should not be construed to limit the scope of the invention. In these examples, all parts and percentages are by weight.

EXAMPLE 1

150 parts of a lead chromate pigment (CI-No. 77600) with the particle size of 0.3 μm was added to a liquid mixture of 1,000 parts of water and 20 parts of JIS K1408 No. 3 aqueous sodium silicate solution ($SiO_2/Na_2O = 3.2$; $SiO_2 = 29.0\%$), and the resulting mixture was sufficiently stirred at room temperature. The mixture was then treated with a mechanical dispersing device (Hareru Homogenizer (manufactured by Kokusan Seiko Cc., Ltd., Japan)) to give a slurry in which the pigment was uniformly dispersed.

This slurry was then heated to and maintained at 90° C. and the pH of the slurry was adjusted to 9.9 by adding an aqueous sodium silicate solution in the state of the slurry being stirred.

Subsequently, a solution prepared by diluting 125 parts of the above-described JIS No. 3 aqueous sodium silicate solution with 650 parts of water (Liquid A) and a solution prepared by diluting 28.5 parts of 75% sulfuric acid with 700 parts of water (Liquid B) were added simultaneously to the above-prepared slurry (while keeping the slurry stirred) at a rate of 5 parts per minute for each liquid while the pH of the slurry was kept at 9.9, thereby conducting the silica-encapsulation treatment.

After completion of the addition of both Liquids A and B, the resulting slurry was subjected to decantation washing at room temperature. To this slurry was then added, with stirring, a solution prepared by dissolving 3.6 parts of antimony trichloride ($SbCl_3$) having a purity of 99%, which amount corresponds to 2.25 parts of $Sb_2O_3$, into 150 parts of water. This slurry was then stirred for 15 minutes, and the pH of the slurry was then adjusted to about 6.5 by gradually adding thereto an aqueous sodium carbonate solution.

After completion of the reaction, the slurry was allowed to stand and washed with water by decantation until the water-soluble salts were completely removed. The resulting slurry was then filtered, dried and pulverized in a conventional manner. Thus, about 185 parts of a lead chromate pigment composition was obtained in which the pigment had been treated with silica and an antimony compound. Chemical analysis revealed that the pigment composition contained 21.6% of silica in terms of $SiO_2$ amount and 1.2% of an antimony compound in terms of $Sb_2O_3$ amount.

The encapsulation state of this sample was examined with a transmission electron microscope. As a result, a translucent and uniform coating of silica-antimony was observed on the surface of each lead chromate pigment particle as a black silhouette.

EXAMPLE 2

The same procedures as in Example 1 were repeated except that 150 parts of a greenish-yellow lead sulfochromate pigment (CI-No. 77603) was used, thereby obtaining about 185 parts of a greenish-yellow lead sulfochromate pigment composition in which the pigment had been treated with silica and an antimony compound.

EXAMPLE 3

The same procedures as in Example 1 were repeated except that 150 parts of an orange lead chromate-molybdate pigment (CI-No. 77605) was used, thereby obtaining about 184 parts of an orange lead chromate-molybdate pigment treated with silica and an antimony compound.

EXAMPLE 4

150 parts of orange lead basic chromate pigment (CI-No. 77601) was treated in the same manner as in Example 1 to obtain a slurry in which the pigment was sufficiently dispersed.

This slurry was then heated to and maintained at 95° C. and the pH of the slurry was adjusted to 10.2, in the state of the slurry being stirred.

Subsequently, 125 parts of the above-described JIS No. 3 aqueous sodium silicate solution was diluted with 1,000 parts of water, and the diluted solution was passed through a column packed with 1,000 parts of a hydrogen-type cation-exchange resin, thereby separately preparing an aqueous silicic acid solution containing 36 parts of silicic acid in terms of the amount of $SiO_2$.

This aqueous silicic acid solution thus prepared separately was then added gradually to the above-obtained slurry which was kept heated at a constant temperature of 95° C. and which had a pH of 10.2 at an addition rate of 8 parts per minute while the pH was controlled according to need by adding a dilute aqueous solution of sodium hydroxide.

After completion of the addition of the silicic acid solution, a 2 wt % aqueous solution of sulfuric acid was added in small portions to the resulting slurry to adjust the pH thereof to 4.5 at 90° C., and then 100 parts of a 2 wt % aqueous solution of L-ascorbic acid was added thereto. The resulting mixture was stirred for 20 minutes.

To this slurry, a solution prepared by dissolving 2.76 parts of antimony fluoride ($SbF_3$) corresponding to 2.25 parts of $Sb_2O_3$ in 100 parts of water was added with stirring over a period of 20 minutes. After the resulting slurry was stirred for 15 minutes, the pH of the slurry was adjusted to about 6.5 by gradually adding thereto an aqueous sodium carbonate solution, thereby completing antimony compound treatment.

After the treatment, the slurry was allowed to stand and washed with water by decantation until the water-soluble salts were completely removed. The resulting slurry was then filtered, dried, and pulverized in a conventional manner. Thus, about 186 parts of an orange basic lead chromate pigment composition was obtained in which the pigment had been treated with silica and an antimony compound.

EXAMPLE 5

The same procedures as in Example 4 were repeated except that 150 parts of lead chromate pigment (CI-No. 77600) was used and the aqueous silicic acid solution was used in an amount corresponding to 18.9 parts of $SiO_2$ and 5.5 parts of antimony trichloride corresponding to 3.4 parts of $Sb_2O_3$ were used. Thus, 172 parts of a lead chromate pigment composition was obtained in which the pigment was encapsulated with silica and an antimony compound.

EXAMPLE 6

Using 150 parts of red lead chromate-molybdate pigment (CI-No. 77605), 220 parts of red lead chromate-molybdate pigment treated with silica and an antimony compound was obtained in the same manner as in Example 1 except that a solution prepared by diluting 240 parts of JIS No. 3 aqueous sodium silicate solution with 1,250 parts of water was used as Liquid A and a solution prepared by diluting 54.9 parts of 75% sulfuric acid with 1,350 parts of water was used as Liquid B, and antimony trichloride was used in an amount corresponding to 1.5 parts of $Sb_2O_3$ after being diluted with 100 parts of water.

EXAMPLE 7

3,000 Parts of lead chromate pigment (CI-No. 77600) having a specific surface area of 3.5 $m^2/g$ was added to a liquid mixture of 20,000 parts of water and 400 parts of JIS No. 3 aqueous sodium silicate solution ($SiO_2/Na_2O=3.2$; $SiO_2=29.0\%$), and the resulting mixture was sufficiently stirred at room temperature. The mixture was then treated with a mechanical dispersing device (Hareru Homogenizer (manufactured by Kokusan Seiko Co., Ltd.)) to give a slurry in which the pigment was uniformly dispersed.

This slurry was then heated to and maintained at 90° C. and the pH of the slurry was adjusted to 9.9 while the slurry was being stirred.

Subsequently, a solution prepared by diluting 2,500 parts of the above-described JIS No. 3 aqueous sodium silicate solution with 13,000 parts of water and a solution prepared by diluting 580 parts of 75% sulfuric acid with 14,000 parts of water were added simultaneously to the above-prepared slurry (while the slurry was being stirred) at a constant addition rate for each liquid over a period of 4 hours while the slurry was kept at pH 9.9 and 90° C., thereby conducting silica-encapsulation treatment.

After completion of the addition of both liquids, the resulting slurry was subjected to washing with water through decantation, thereby removing the water-soluble salts.

To this water-washed slurry there was added while stirring at room temperature over a period of 30 minutes a solution prepared by dissolving antimony trichloride in an amount corresponding to 50 parts of $Sb_2O_3$ in 3,000 parts of a saturated aqueous solution of sodium chloride.

After completion of the addition, the resulting slurry was stirred for 15 minutes, and the pH of the slurry was then adjusted to about 6.5 by gradually adding thereto a dilute sodium hydroxide solution.

The thus-treated slurry was washed with water, filtered, dried, and pulverized in a conventional manner. Thus, about 3,700 parts of a lead chromate pigment composition was obtained in which the pigment was encapsulated with silica in an amount of 21% in terms of $SiO_2$ amount and with an antimony compound in an amount of 1.3% in terms of $Sb_2O_3$ amount, the antimony compound amount of 1.3% corresponding to 5 mg per $m^2$ of the lead chromate pigment.

EXAMPLE 8

An aqueous solution of lead nitrate was prepared by dissolving litharge in an amount of 1,000 parts in terms of PbO amount into 900 parts of 62% nitric acid and then diluting this solution with 10,000 parts of water. To this solution was added a solution prepared by dissolving 600 parts of sodium dichromate ($Na_2Cr_2O_7$ $2H_2O$), 40 parts of sodium sulfate, 112 parts of sodium chloride, and 172 parts of sodium hydroxide in 5,000 parts of water, while the temperatures of both solutions were kept at 50° C., thereby conducting a chrome yellow-precipitation reaction.

To the slurry thus obtained through precipitation there was added a solution prepared by diluting 53 parts of an aqueous zirconyl sulfate solution having a concentration of 28% in terms of $ZrO_2$ concentration with 1,000 parts of water at 50° C.

Thereafter, an aqueous sodium carbonate solution was added to the resulting slurry to neutralize it. The neutralized slurry was sufficiently decantation-washed with water.

Thus, a slurry of 1,500 parts of lead chromate pigment (CI-No. 77600) having a specific surface area of 4.2 $m^2/g$ was obtained.

The concentration of the above-obtained slurry was adjusted so that the resulting slurry was composed of 1,500 parts of pigment and 10,000 parts of water. There was then added thereto 200 parts of JIS No. 3 aqueous sodium silicate solution. The resulting mixture was stirred to disperse the pigment and then further treated with the mechanical dispersing device in the same manner as in Example 7, thereby obtaining a slurry in which the pigment was sufficiently dispersed at room temperature.

This slurry was then heated to 95° C. and the pH of the slurry was adjusted to 9.6 in the state of the slurry being stirred. Subsequently, a solution prepared by diluting 1,250 parts of JIS No. 3 aqueous sodium silicate solution with 6,500 parts of water and a solution prepared by diluting 290 parts of 75% sulfuric acid with 7,000 parts of water were added simultaneously to the above slurry over a period of 3 hours while the initial temperature of 95° C. and the pH of 9.6 were maintained.

After completion of the simultaneous addition, the resulting slurry was repeatedly decantation-washed with water, thereby removing the water-soluble salts contained in the mother liquor. To this water-washed slurry was added, over a period of 20 minutes, a solution prepared by dissolving antimony trichloride in an amount corresponding to 25 parts of $Sb_2O_3$ in 500 parts of a saturated aqueous solution of sodium chloride at room temperature.

The pH of the slurry, which had lowered to 2.7 through the above addition, was adjusted to 6.5 with a dilute aqueous sodium hydroxide solution. The resulting slurry was then treated in the same manner as in Example 7, thereby obtaining about 1,850 parts of a lead chromate pigment composition in which the pigment was encapsulated with silica and an antimony compound.

EXAMPLE 9

The same encapsulation treatment with silica and an antimony compound as in Example 7 was conducted except that 3,000 parts of lead sulfochromate pigment (CI-No. 77603) having a specific surface area of 4.9 $m^2/g$ was used in place of the lead chromate pigment (CI-No. 77600) used in Example 7 and that the amount of JIS No. 3 aqueous sodium silicate solution used was changed to 1,800 parts, that of the 75% sulfuric acid was changed to 420 parts, and that of antimony trichloride was changed to 100 parts in terms of $Sb_2O_3$ amount.

EXAMPLE 10

1,500 parts of orange lead chromate-molybdate pigment (CI-No. 77605) having a specific surface area of 7.8 $m^2/g$ was dispersed in a liquid mixture of 200 parts of JIS No. 3 aqueous sodium silicate solution and 20,000 parts of water in the same manner as in Example 7, thereby preparing a slurry in which the pigment was sufficiently dispersed. This slurry was then heated to and maintained at 90° C. and the pH of the slurry was adjusted to 9.6.

Subsequently, a solution prepared by dissolving 1,400 parts of JIS No. 3 aqueous sodium silicate solution in 7,300 parts of water and a solution prepared by diluting 320 parts of 75% sulfuric acid with 7,800 parts of water were added simultaneously to the above-obtained slurry over a period of 3 hours, while the initial temperature of 90° C. and pH of 9.6 were maintained.

After completion of the addition and reaction, the resulting slurry was decantation-washed with water once. There was then added thereto, over a period of 30 minutes, a solution prepared by dissolving antimony trichloride in an amount corresponding to 45 parts of $Sb_2O_3$ in 900 parts of a saturated aqueous solution of sodium chloride at room temperature.

The resulting slurry was then treated in the same manner as in Example 7, thereby obtaining about 2,000 parts of an orange lead chromate-molybdate pigment encapsulated with silica and an antimony compound.

COMPARATIVE EXAMPLE 1

According to the procedures described in Example 1 of U.S. Pat. No. 3,690,906, a lead chromate pigment treated with silica and antimony was obtained as follows.

110 parts of lead nitrate was dissolved in 500 parts of water at 45° C. This solution was then dissolved in a solution prepared by dissolving 48.8 parts of sodium dichromate and 12.8 parts of sodium hydroxide in 1,600 parts of water, at 35° C. with stirring, over a period of 30 minutes.

The thus-obtained slurry of a lead chromate pigment (CI-No. 77600) was washed twice with water by decantation, and a solution of 1 part of sulfuric acid in 10 parts of water was added to the slurry.

To this slurry was added, with stirring, a solution in 100 parts of water of 11 parts of sodium silicate having a concentration of 30% by weight in terms of $SiO_2$ concentration. There was then added thereto a solution prepared by dissolving 4.4 parts of antimony trichloride, 6.7 parts of triethanolamine, 3.4 parts of mannitol, and 1.6 parts of sodium hydroxide in 40 parts of water.

A solution of 2 parts of sulfuric acid in 20 parts of water was then added to the slurry which was being stirred to thereby adjust the pH of the slurry to 5.5.

Thereafter, the resulting slurry was washed with water in a conventional manner until the water soluble salts were completely removed, and the washed slurry was filtered, dried, and pulverized. Thus, 110 parts of a lead chromate pigment was obtained which had been modified with 2.9% of silica in terms of $SiO_2$ amount and with 2.4% of antimony in terms of $Sb_2O_3$ amount.

COMPARATIVE EXAMPLE 2

According to the procedures described in Example 31 of JP-B-49-16531, an antimony-treated red lead chromate-molybdate pigment was obtained as follows.

An aqueous paste prepared by sufficiently dispersing 75 parts of red lead chromate-molybdate pigment (CI-No. 77605) in 75 parts of water was dispersed in 300 parts of an aqueous antimony trichloride solution having a concentration of 0.1 mol/l in terms of $Sb_2O_3$ concentration, thereby obtaining a slurry.

This slurry was then placed in an autoclave made of glass-lined iron. The slurry was heated to 200° C. at a rate of 40° C./hr and further heated from 200° C. to 220° C. at a rate of 20° C./hr, while the slurry was being stirred. Thereafter, the slurry was kept at a maximum temperature of 220° C. and a maximum pressure of 24 kg/cm² for 30 minutes.

After cooling, the resulting slurry was filtered and washed with water until the pH of the filtrate became 6.5.

The washed slurry was then filtered, dried, and pulverized in a conventional manner, thereby obtaining 82 parts of red lead chromate-molybdate pigment treated with 10.5% of antimony in terms of $Sb_2O_3$ amount.

COMPARATIVE EXAMPLE 3

According to the procedures described in Example 1 of JP-B-46-34788, a lead chromate pigment treated with silica and alumina was obtained as follows.

150 parts of lead chromate pigment (CI-No. 77600 was uniformly slurried with 1,000 parts of water by stirring.

To this slurry was then added the above-described JIS No. 3 aqueous sodium silicate solution in an amount of 2.84 parts in terms of $SiO_2$ amount. The resulting slurry was stirred.

This slurry was treated once with a homogenizer at a pressure of 352 kg/cm².

As cleaning water, 250 parts of water was used, which was added to the slurry.

The thus-obtained slurry consisting of 150 parts of the pigment and 1,250 parts of water was heated to 90° C. over a period of 30 minutes, and the pH of this slurry was adjusted to 9.0 with an aqueous sodium hydroxide solution.

Subsequently, a solution prepared by diluting 125 parts of the above-described sodium silicate solution with water in such an amount as to result in a final water content of 600 parts and a solution prepared by diluting 17.3 parts of 96% sulfuric acid with water in such an amount as to result in a final water content of 800 parts were simultaneously added to the above-obtained slurry, with stirring, at a constant addition rate of 3 parts per minute for each solution.

A solution prepared by dissolving aluminum sulfate in an amount of 3.3 parts in terms of $Al_2O_3$ amount in 100 parts of water was then added to the above slurry. The pH of the resulting slurry was adjusted to 6.5 with an aqueous sodium hydroxide solution, to thereby complete the treatment.

Thereafter, the slurry was washed with water in a conventional manner until the soluble salts were completely removed, and the washed slurry was filtered, dried (80° C.), and pulverized. Thus, 190 parts of a lead chromate pigment was obtained which had been modified with 20.3% of $SiO_2$ and 1.7% of $Al_2O_3$.

COMPARATIVE EXAMPLE 4

Silica treatment was conducted in the same manner as in Example 1.

The resulting slurry was washed with water by decantation to remove the water-soluble salts. Water was then added to the washed pigment to give a pigment slurry having a pigment concentration of about 10% by weight. A small amount of sulfuric acid was added thereto to adjust the pH of the slurry to 1.8.

To this slurry was added 100 parts of a 2 wt % aqueous solution of L-ascorbic acid. The resulting mixture was stirred for 20 minutes to thereby sufficiently reduce the hexavalent chromium remaining on the surfaces of the silica-treated pigment particles to trivalent chromium.

Subsequently, the pH of the slurry was adjusted to 6.5. The resulting slurry was water-washed again by decantation, and then filtered, dried, and pulverized in a conventional manner. Thus, about 180 parts of a lead chromate pigment was obtained which had been treated with 21.8% of silica in terms of $SiO_2$ amount and had undergone a reduction treatment.

PROPERTY EVALUATION

The pigment samples obtained in the above Examples and Comparative Examples were evaluated for color fastness and other properties as follows.

(1) Heat Resistance Test 2.5 Parts of each sample was mixed with 500 parts of a polypropylene resin. This mixture was formed into color chips to be tested by means of an extruder (30 mmφ; manufactured by Thermo Plastics Industry Co., Ltd., Japan) at 210° C.

The color chips obtained from each sample were injection-molded into a standard panel by means of a screw-type injection molding machine (Type SAV-30-A; manufactured by Yamashiro Seiki Seisakusho K.K., Japan) at a temperature of 210° C. and a cycle time of 24 seconds.

A test panel was then prepared in the same manner as that for the standard panel except that the molten resin was allowed to reside in the molding machine at 300° C. for 5 minutes. This test panel was compared in discoloration degree with the standard panel to judge the heat resistance.

(2) Light Fastness Test

In accordance with JIS K5101, 2.0 parts of each sample and 1.0 part of castor oil were kneaded by subjecting the mixture thereof twice to 100-revolution treatment with a Hoover-type muller (manufactured by Tester Sangyo Co., Ltd., Japan) at a load of 150 pounds (68 kg), thereby obtaining an uniform paste.

Subsequently, 2.5 parts of the above-obtained paste was sufficiently mixed with 6.0 parts of a melamine alkyd resin (Nissan Melami No. 1-2 Clear; manufactured by Nippon Oil & Fats Co., Ltd., Japan) to obtain a paint.

This paint was then uniformly coated on an aluminum foil with a 6-mil (0.15-mm) applicator. The coated aluminum foil was allowed to stand for 60 minutes and then subjected to baking for 60 minutes in a constant-temperature hot-air drying oven regulated to have a temperature of 130° C., thereby preparing a coated test piece.

Each of the test pieces prepared by the above method was subjected to 200-hour exposure by means of a fadeometer (Type FA-2; manufactured by Suga Testing Machine Co., Ltd., Japan; light source, carbon-arc lamp).

The thus-exposed test piece was compared with an unexposed coated test piece to judge the degree of hue change.

(3) Sulfide Resistance Test

The same test pieces as those subjected to the light fastness test ware prepared. Each test piece was immersed in a saturated hydrogen sulfide aqueous solution at 30° C. for 60 minutes.

The thus-immersed test piece was compared with an unimmersed coated test piece to judge the degree of hue change.

(4) Acid Resistance Test

Coated test pieces ware prepared in the same manner as used for the test pieces subjected to the Light Fastness Test except that glass plates were used in place of aluminum foils.

Each test piece was immersed in concentrated hydrochloric acid (12N) at 35° C. for 15 minutes.

The thus-immersed test piece was compared with an unimmersed coated test piece to judge the degree of hue change.

(5) Alkali Resistance Test

Coated test pieces were prepared using glass plates in the same manner as that for the test pieces subjected to the acid resistance test.

At room temperature, each test piece was immersed for 24 hours in a solution prepared by mixing a saturated aqueous solution of calcium hydroxide with a 2 wt % aqueous solution of potassium hydroxide.

The thus-immersed test piece was compared with an unimmersed coated test piece to judge the degree of hue change.

(6) Hexavalent Chromium Elution Test

One g of each pigment sample was added to 100 ml of 0.3N hydrochloric acid, and this mixture was stirred at 20° C. for 60 minutes to conduct elution.

The resulting dispersion was subjected to solid-liquid separation. The extract was analyzed by the diphenylcarbazide absorptiometric method as specified in JIS K0102, to determine the concentration of hexavalent chromium that had dissolved out into the extract.

The determination limit for this analysis was 0.04 ppm.

(7) Lead Elution Test

Elution was conducted under the same conditions as used for test (6).

The extract was then analyzed by atomic absorption spectroscopy. From the result, the amount of Pb that had dissolved out was calculated in terms of percent based on the amount of the pigment sample.

(8) Reverse Mutation Assay

Reverse mutation assay using various kinds of microorganisms was entrusted to the Japan Biochemical Center Inc. (head office: Toyosaki 4-12-17, Oyodo-ku, Osaka-shi, Japan; Laboratory: Hukue 52, Kaizu-cho, Kaizu-gun, Gifu-ken, Japan).

The procedures of the assay were as follows.

The dose levels determined for each test sample were 5 or more levels with a maximum concentration of 5,000 μg per plate and a dilution ratio of 2. To 0.1 ml of the test substance solution was added 0.5 ml of 0.1M phosphoric acid buffer (pH=7.4).

In the case where metabolic activation was to be conducted, 0.5 ml of S-9 mix was added.

There was then added thereto 10.1 ml of each strain suspension. The resulting suspension was pre-incubated at 37° C. for 20 minutes with shaking.

Then, 2.0 ml of a top agar was added to the pre-incubated suspension. The resulting suspension was stirred and then overlaid onto minimum glucose agar plates.

Three such minimum glucose agar plates were used for each dose level.

In order to confirm reproducibility, an independent experiment was further conducted.

After 48-hour incubation at 37° C., the resulting revertant colonies were counted. Toxic activation was judged with a stereoscopic microscope.

The number of revertant colonies on each plate was shown in terms of found value and average value. Based on these values, a dose response curve (test results) for each strain was obtained.

The following criteria were used for judgment in each case.

(1) The test substance was judged positive when the number of revertant colonies for the test substance-treated groups had increased to a value which was not less than 2 times that of negative (solvent) control groups, and when dose response and reproducibility were observed.

(2) The test substance was judged positive when a significant increase was observed in revertant colony number difference between the test substance-treated groups and the negative (solvent) control groups in a Rayan multiple comparison, and when dose response and reproducibility were observed.

Figure 7:
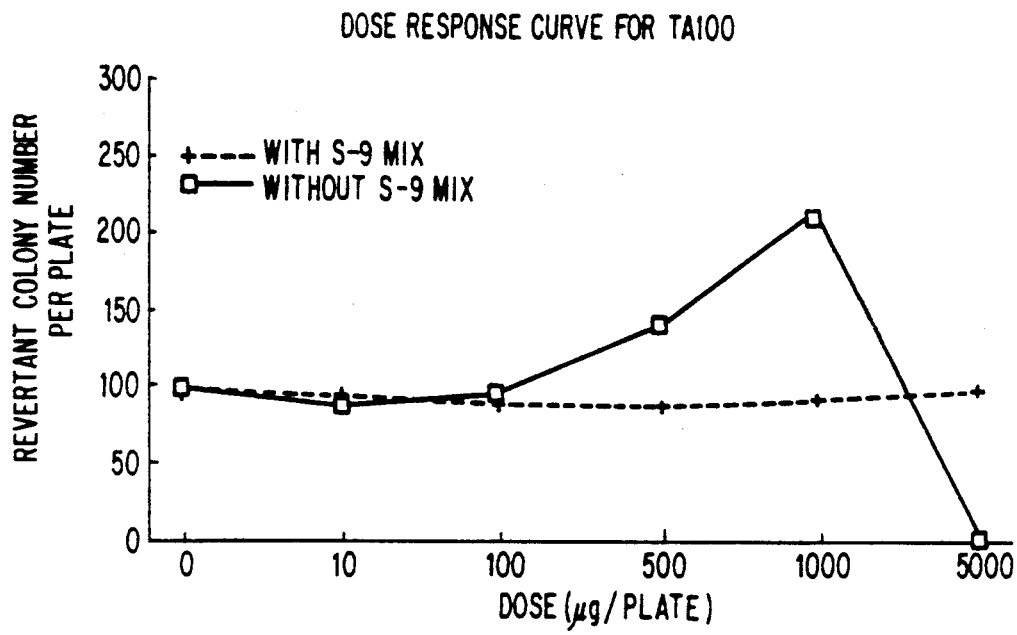
FIG. 7 is a dose response curve showing the results of a reverse mutation assay for the pigment sample of Comparative Example 3 using TA100 strain. Although there was no substantial change when S-9 mix was added, a considerable increase in revertant colony number was observed when S-9 mix was not added.
Figure 8:
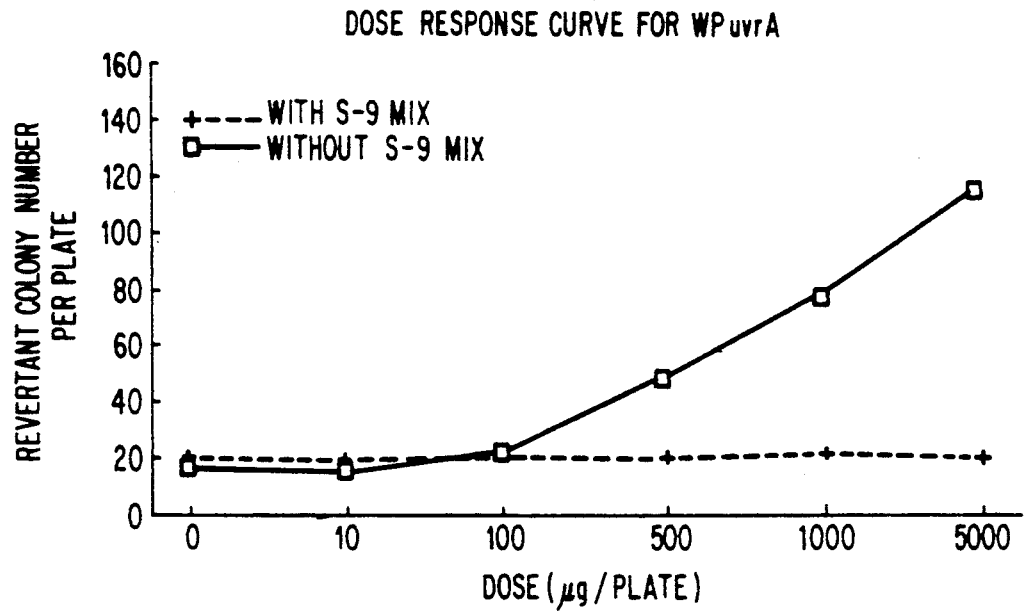
FIG. 8 is a dose response curve showing the results of a reverse mutation assay for the pigment sample of Comparative Example 3 using WP2uvrA strain. Although there was no substantial change when S-9 mix was added, a considerable increase in revertant colony number was observed when S-9 mix was not added.

The results of the revertant mutation assay of the pigment sample of Example 7 using 6 kinds of microorganisms are shown in FIGS. 1 to 6, respectively, while those for the pigment sample of Comparative Example 3 using 3 kinds of microorganisms are shown in FIGS. 7 to 9, respectively.

The results of the above tests (1) to (8) are summarized in Table 1. With respect to tests (1) to (5), the results were evaluated using 10 grades in such a manner that samples which severely discolored are shown by grade "1" and samples which did not suffer discoloration are shown by grade "10".

As is apparent from FIGS. 1 to 9 and Table 1, the lead chromate pigment composition according to the present invention shows extraordinarily improved color fastness to various external stimuli, has the property of suppressing the dissolution of hexavalent chromium and lead into strong aqueous acid solutions, such a property being not obtained with conventional techniques, and is completely negative in inducing reverse mutation of microorganisms.

While the invention has been described in detail and with reference to specific embodiments thereof, it will be apparent to one skilled in the art that various changes and modifications can be made therein without departing from the spirit and scope thereof.

TABLE 1

|  | (1) Heat resistance | (2) Light fastness | (3) Sulfide resistance | (4) Acid resistance | (5) Alkali resistance | (6) $Cr^{6+}$ concentration (ppm) | (7) Dissolved Pb amount (%) | (8) Reverse mutation assay |
|---|---|---|---|---|---|---|---|---|
| Ex. 1 | 10 | 10 | 10 | 10 | 10 | 0.04 or less | 0.5 or less | — |
| Ex. 2 | 10 | 10 | 10 | 10 | 10 | 0.04 or less | 0.5 or less | — |
| Ex. 3 | 10 | 10 | 10 | 10 | 10 | 0.04 or | 0.5 or |  |

TABLE 1-continued

|  | (1) Heat resistance | (2) Light fastness | (3) Sulfide resistance | (4) Acid resistance | (5) Alkali resistance | (6) $Cr^{6+}$ concentration (ppm) | (7) Dissolved Pb amount (%) | (8) Reverse mutation assay |
|---|---|---|---|---|---|---|---|---|
| Ex. 4 | 10 | 10 | 10 | 10 | 10 | 0.04 or less | 0.5 or less | — |
| Ex. 5 | 9 | 10 | 10 | 10 | 10 | 0.04 or less | 0.5 or less | — |
| Ex. 6 | 10 | 9 | 10 | 10 | 10 | 0.04 or less | 0.5 or less | — |
| Ex. 7 | 10 | 10 | 10 | 10 | 10 | 0.04 or less | 0.5 or less | negative |
| Ex. 8 | 10 | 10 | 10 | 10 | 10 | 0.04 or less | 0.5 or less | negative |
| Ex. 9 | 10 | 10 | 10 | 10 | 10 | 0.04 or less | 0.5 or less | negative |
| Ex. 10 | 10 | 10 | 10 | 10 | 10 | 0.04 or less | 0.5 or less | negative |
| Comp. Ex. 1 | 3 | 8 | 6 | 3 | 8 | 21.2 | 4.6 | positive |
| Comp. Ex. 2 | 2 | 8 | 7 | 3 | 8 | 24.6 | 3.1 | positive |
| Comp. Ex. 3 | 8 | 9 | 9 | 8 | 10 | 68.0 | 3.8 | positive |
| Comp. Ex. 4 | 8 | 9 | 9 | 8 | 10 | 42.0 | 3.2 | positive |

What is claimed is:

1. A stable lead chromate pigment composition consisting essentially of lead chromate pigment particles which have been encapsulated with a continuous amorphous silica encapsulating layer directly on the surface of each lead chromate pigment particle in an amount of from 10% to 40% by weight in terms of the amount of $SiO_2$ based on the total amount of the treated lead chromate pigment particles and subsequently depositing an antimony compound on the silica encapsulating layer in an amount of from 0.5 to 5% by weight in terms of the amount of $Sb_2O_3$ based on the total amount of the treated lead chromate pigment particles, said composition releasing hexavalent chromium at a concentration of 20 ppm or less in terms of the concentration of dissolved Cr when brought into contact with 0.3N hydrochloric acid and being negative in a reverse mutation assay using a microorganism.

2. A stable lead chromate pigment composition as claimed in claim 1, wherein the amount of the silica encapsulation is from 10% to 40% by weight in terms of the amount of $SiO_2$ based on the total amount of the treated pigment, and the amount of the antimony compound is from 1 to 50 mg/m² in terms of the amount of $Sb_2O_3$ per m² of the surface area of the lead chromate pigment.

3. A stable lead chromate pigment composition as claimed in any one of claims 1 or 2, which when brought into contact with 0.3N hydrochloric acid, releases hexavalent chromium into the acid at a concentration of 0.2 ppm or less in terms of the concentration of dissolved Cr, and releases lead into the acid in an amount of 1% by weight or less in terms of the amount of dissolved Pb, based on the total amount of the composition.

4. A process for producing a stable lead pigment composition, which comprises:
   (a) adding an aqueous solution of an alkali silicate to an alkaline slurry of a lead chromate pigment while the slurry is kept heated at 80° to 98° C. and the pH of the slurry is maintained at 9.3 to 10.5,
   (b) reacting the alkali silicate with the lead chromate pigment to thereby form a continuous amorphous silica coating on the surface of each particles of the pigment in an amount of from 10% to 40% by weight in terms of the amount of $SiO_2$ based on the total amount of the pigment, thereby encapsulating each pigment particles with silica, and
   (c) then adding an aqueous solution of an antimony salt to the resulting silica-encapsulated lead chromate pigment slurry to thereby deposit an antimony compound on the silica encapsulated lead chromate pigment in an amount of from 1 to 50 mg/m² in terms of the amount of $Sb_2O_3$ per m² of the surface area of the pigment.

* * * * *